United States Patent [19]

Germain

[11] 4,058,979

[45] Nov. 22, 1977

[54] ENERGY STORAGE AND CONVERSION TECHNIQUE AND APPARATUS

[76] Inventor: Fernand Germain, Bois-Thibault-Balata, 97200 Fort de France, Martinique, British W. Indies

[21] Appl. No.: 728,857

[22] Filed: Oct. 1, 1976

[30] Foreign Application Priority Data

Feb. 10, 1975 France .............................. 75.30155

[51] Int. Cl.² .............................................. F15B 11/06
[52] U.S. Cl. .......................................... 60/327; 60/398; 60/407; 60/412; 290/55
[58] Field of Search .................. 60/327, 398, 407, 409, 60/410, 412, 416, 698, 701; 290/44, 55; 417/334

[56] References Cited

U.S. PATENT DOCUMENTS

| 320,482 | 6/1885 | Leavitt | 60/407 X |
| 2,112,633 | 3/1938 | Moon | 60/409 X |
| 2,239,893 | 4/1941 | Jackman | 60/416 X |

*Primary Examiner*—Edgar W. Geoghegan

[57] ABSTRACT

The kinetic energy of the wind is converted into compressed air which is stored, in a system which maintains a predetermined output pressure, for use in driving a turbine coupled to an electrical power generator. The gas storage system includes two pair of serially connected storage tanks with the first tank in each pair receiving compressed air from wind driven compressors and including a hydraulically actuated piston for use in forcing the air into the second tank. Each of the second tanks of each pair includes a floating piston which will be caused to ascend in response to the delivery of pressurized gas thereto from the serially connected tank including the hydraulically actuated piston and the pressure in each of the second tanks will be maintained by the weight of the floating piston.

4 Claims, 1 Drawing Figure

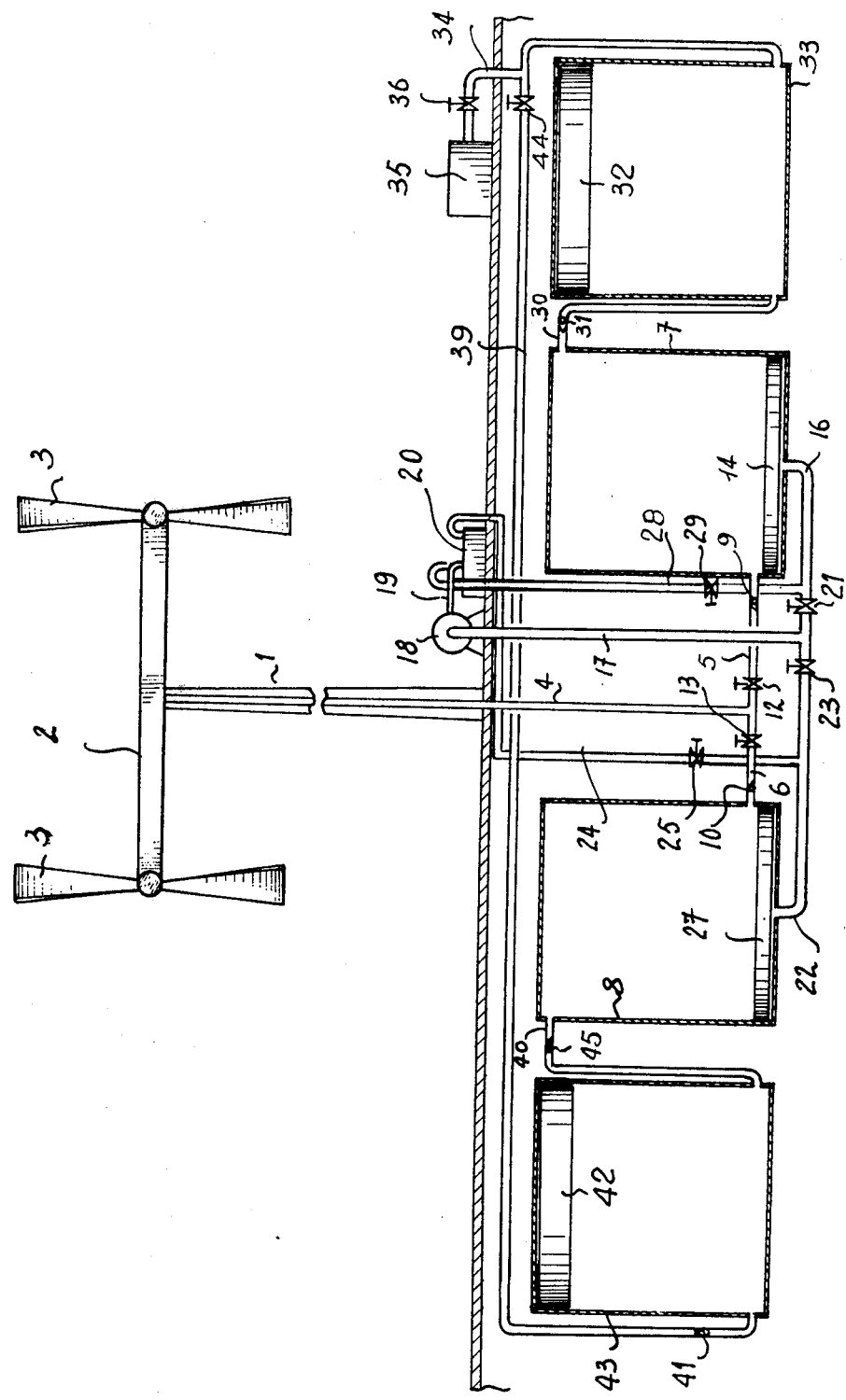

ENERGY STORAGE AND CONVERSION TECHNIQUE AND APPARATUS

BACKGROUND OF THE INVENTION

1. Field of the Invention

The present invention relates to the production of electrical energy and particularly to the generation of electrical energy without combustion of hydrocarbon fuel. More specifically, this invention is directed to apparatus for converting the kinetic energy of the wind into potential energy, in the form of a pressurized gas, which may be employed in the driving of an electrical power generator. Accordingly, the general objects of the present invention are to provide novel and improved methods and apparatus of such character.

2. Description of the Prior Art

The desire to harness the power of the wind to generate electrical power has long existed and, because of recent disruptions in the supply of or limitations on the use of hydrocarbon fuels, interest in this area of technology is rapidly increasing. Numerous wind driven generator schemes have been proposed and, in some cases, implemented. Most of the prior art proposals have contemplated directly coupling a mechanism rotated by the wind to a generator. Such directly driven systems have a number of inherent disadvantages. Thus, by way of example, if a propeller or other wind driven rotor is coupled to an alternating current generator the frequency of the current generated will vary with the wind intensity unless sophisticated regulation circuitry is employed. With either alternating or direct current generators coupled to the wind engine rotor, the generated power will vary with wind intensity and the storage of energy to smooth out the fluctuations in wind intensity presents an almost unsurmountable problem. Thus it has been proposed to employ the generated electrical energy to charge expensive banks of batteries or to drive the pumps of a pumped water storage system. It has also been proposed to utilize a wind driven generator to provide power for the electrolysis of water followed by the storage of combustible hydrogen gas. All of these proposed storage schemes require expensive apparatus and facilities and thus have not to date gained acceptance.

The present applicant, in his French patent application Ser. No. 74 12 911 has previously proposed a power generation technique wherein a wind engine is mechanically coupled to a compressor and the pressurized gas discharged from the compressor is delivered to a storage tank. The interior of the compressed gas storage tank is, via a controllable valve, coupled to a turbine which drives an electrical generator. Means are provided within the storage tank for maintaining the pressure of the gas therein at a constant level as gas is drawn off for driving the turbine. Thus, in accordance with a previous proposal of the present applicant, movement of the rotor of the wind engine results in the production of compressed gas, rather than electrical energy, which may be stored with comparative ease until it is desired to use such gas to drive a turbine coupled to an electrical powered generator.

SUMMARY OF THE INVENTION

The present invention comprises a technique and apparatus for improving the efficiency of the above discussed energy storage and conversion system devised by the present applicant. Thus, the present invention provides an uncomplicated and inexpensive system for the conversion of the kinetic energy of the wind into electrical energy. Apparatus in accordance with the present invention includes means for storing, in the form of compressed gas, energy extracted from the wind.

In accordance with a preferred embodiment of the invention at least a first wind engine has its rotor coupled to an air compressor. Pressurized gas discharged from the compressor is delivered to a first air storage reservoir. The preferred embodiment of the invention also comprises a turbine or similar fluid driven device which is mechanically coupled to an electrical power generator. The improvement of the present invention consists of the installation, between the first air storage reservoir and the turbine, of a second air storage reservoir containing a movable piston. The preferred embodiment of the present invention also contemplates the employment of a movable piston controlled by a source of liquid under pressure in the first air storage reservoir whereby the delivery of hydraulic fluid to the first reservoir will cause the compressed air to be forced into the second reservoir where it forces the piston upwardly.

The present invention also contemplates a parallel system utilizing two pair of serially connected storage reservoirs whereby the first reservoir of one pair may be charged with gas from the compressor while gas is being withdrawn from the second reservoir of the other pair to drive the generator.

BRIEF DESCRIPTION OF THE DRAWING

The present invention may be better understood and its numerous objects and advantages will become apparent to those skilled in the art by reference to the accompanying drawing which is a schematic diagram of a preferred embodiment of the invention.

DESCRIPTION OF THE PREFERRED EMBODIMENT

With reference to the drawing, a wind engine or engines may advantageously be mounted on top of a pylon 1. Thus, as shown in the drawing, a frame or bar 2, rotatable about a vertical axis, is mounted on pylon 1. Frame 2 supports, at its oppositely disposed ends, a pair of wind engines which include propellers 3. The drive shafts on which the propellers 3 are mounted are coupled to a pair of air compressors, not shown, which will be mounted directly behind the hubs of the propellers. The air compressors are connected in parallel and thus discharge pressurized gas, for the purposes to be described below, into a common pressurized gas supply conduit 4. The frame 2 will automatically be rotated, in the manner known in the art, so that propellers 3 will always face into the wind.

Conduit 4 is connected, via a first branch conduit 5, to an air storage reservoir 7. Conduit 4 is also coupled, via a second branch conduit 6, to an air storage reservoir 8. Conduit 5 has, disposed therein, a check valve 9 and a gate or control valve 12. Similarly, branch conduit 6 includes a check valve 10 and a control valve 13. Valves 12 and 13 may be manually or automatically actuated to achieve the operational mode to be described below.

Air storage reservoir or tank 7 includes a movable piston 14 which may, under the action of a pressurized liquid, be raised so as to increase the pressure of any gas contained in the reservoir. Pressurized liquid, typically oil, for causing upward movement of piston 14 is furnished by a pump 18 which is coupled, via a conduit 19, to a liquid storage tank 20. Pump 18 is connected to the interior of reservoir 7 via a main supply conduit 17 and a branch conduit 16. The pressurized liquid supplied by pump 18 may also be delivered to the interior of reservoir 8, which includes a movable piston 27, via main liquid supply conduit 17 and a branch conduit 22. Branch conduits 16 and 22 are respectively provided with control valves 21 and 23. Liquid may be returned, respectively from reservoirs 7 and 8, to liquid storage tank 20 via conduits 28 and 24. Conduits 28 and 24 are respectively coupled to branch conduits 16 and 22 at the downstream side of control valves 21 and 23. The return conduits 28 and 24 include respective control valves 29 and 25.

The interior of air storage reservoir 7, particularly the upper end of the tank which is disposed away from the rest or unenergized position of piston 14, is coupled to the interior of a second air storage reservoir 33 by means of a conduit 30. Conduit 30 includes a check valve 31. A movable piston 32 is disposed within reservoir 33. Reservoir 33 is provided with an output conduit which is connected, via a common supply conduit 34, to a pneumatic motor-electrical generator arrangement 35. The supply of pressurized fluid to the turbine of motor-generator 35 may be interrupted by means of a control valve 36 disposed in conduit 34.

The interior of reservoir 8, at the end opposite to the rest piston position of piston 27, is coupled to the interior of an air storage reservoir 43 via a conduit 40 which includes a check valve 45. Reservoir 43 has, disposed therein, a movable piston 42. An output conduit 39, including a check valve 41, couples the interior of reservoir 43 to supply conduit 34 for motor-generator 35. A control valve 44 is also disposed in conduit 39.

In operation the propellers 3 are driven by the wind and thus drive their associated compressors. Presuming control valve 12 to initially be open and valve 13 to be closed, the compressed air produced by the compressors will be delivered to reservoir 7 via conduits 4 and 5. When the pressure in reservoir 7 reaches a predetermined level, pump 18 will be energized and oil under pressure will be delivered into reservoir 7 via conduits 17 and 16. At this time the control valve 21 will have been opened and valve 23 will be closed. The delivery of oil under pressure to the interior of reservoir 7 at the base thereof will force piston 14 upwardly and the compressed air in reservoir 7 will be forced, via conduit 30, into reservoir 33. This operation may be repeated as often as necessary to pressurize reservoir 33 to the desired level. As reservoir 33 is pressurized the piston 32 therein will be driven upwardly to the position shown and the pressure in reservoir 33 will thus be maintained by the weight of piston 32.

During periods when pressurized liquid from pump 18 is being delivered to the interior of reservoir 7, the control valve 12 will be closed and valve 13 open such that the compressed gas produced by the compressors coupled to propellers 3 will be delivered to the interior of reservoir 8.

Pump 18 will be deenergized whenever piston 14 reaches the top of reservoir 7. Control valve 21 will be closed simultaneously with the deenergization of pump 18 and previously closed control valve 29 will be opened thereby allowing the oil which has been delivered to reservoir 7 to return to tank 20 via conduits 16 and 28; the oil being forced back into tank 20 by the weight of piston 14.

During the period when piston 14 is descending, the air pressure within reservoir 8 will continue to increase. When the air pressure within reservoir 8 reaches the desired level, pump 18 will be reenergized, valve 23 opened and, in the manner described above with respect to reservoir 7, piston 27 will be driven upwardly thus forcing the pressurized air from reservoir 8 into reservoir 43. During the period when liquid is being pumped into reservoir 8, the state of the various control valves will have been switched such that the compressed air from conduit 4 is again delivered to the interior of reservoir 7; such delivery of compressed air to reservoir 7 being initiated when piston 14 reaches the bottom of the tank. When piston 27 reaches the top of reservoir 8 pump 18 will again be deenergized, valve 23 will be closed and valve 25 will be opened. Accordingly, the oil in reservoir 8 will, under the weight of piston 27, be returned to tank 20 via conduits 22 and 24.

Through proper control of valves 36 and 44, pressurized gas from tanks 33 and 43 may be employed to drive the turbine of motor-generator 35.

It will be understood that the various control valves of the present invention may be operated electrically and in accordance with a stored program. It will also be understood that such an automatic control will include pressure sensors associated with the various air storage reservoirs as well as means for sensing the positions of the pistons 14 and 27.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for the production of electrical energy comprising:
   wind driven compressor means, said compressor means including at least a first wind responsive rotor and producing pressurized air in response to rotation of said rotor;
   first air storage reservoir means, said first reservoir means including a first piston;
   first conduit means for selectively delivering pressurized air from said wind driven compressor means to the interior of said first reservoir means, said first conduit means being connected to said first reservoir means at a point located to a first side of said first piston when said first piston is in a deenergized state;
   a source of pressurized liquid;
   second conduit means for selectively coupling said source of pressurized liquid to the interior of said first reservoir means at the second side of said first piston to energize said first piston;
   second air storage reservoir means, said second storage reservoir means including a second piston;
   third conduit means for coupling the interior of said first reservoir means at said first side of said first piston to the interior of said second reservoir means at a first side of said second reservoir means piston;
   generator means, said generator means including a pneumatic motor coupled to an electrical power generator; and fourth conduit means for selectively coupling the interior of said second reservoir means at said first side of said second piston to said generator means.

2. The apparatus of claim 1 further comprising:

third air storage reservoir means, said third air storage reservoir means including a third piston;

fifth conduit means for selectively coupling the interior of said third air storage reservoir means to said compressor means, said fifth conduit means being connected to said third reservoir means at a point located to a first side of said third piston when said third piston is in a deenergized state;

sixth conduit means for selectively coupling the interior of said third air storage reservoir means at the second side of said third piston to said source of pressurized liquid to energize said third piston;

fourth air storage reservoir means, said fourth air storage reservoir means including a fourth piston;

seventh conduit means for selectively coupling the interior of said third air storage reservoir means at said first side of said third piston to the interior of said fourth air storage reservoir means at a first side of said fourth piston; and eighth conduit means for selectively coupling the interior of said fourth air storage reservoir means at said first side of said fourth piston to said generator means.

3. An energy conversion and storage method comprising the steps of:

utilizing the force of the ambient wind to produce compressed air;

selectively delivering the thus produced compressed air to a first intermediate storage reservoir;

selectively delivering liquid to the interior of the first intermediate storage reservoir to force the compressed air therefrom under pressure into a first storage tank, liquid being delivered to the intermediate reservoir during periods when compressed air is not being delivered to the reservoir;

maintaining the air in the first storage tank at a constant pressure regardless of volume; and selectively venting compressed air from the first storage tank to a pneumatic motor coupled to an electrical power generator whereby electrical energy will be generated.

4. The method of claim 3 further comprising the steps of:

alternating the delivery of compressed air to the first intermediate storage reservoir and to a second intermediate storage reservoir;

alternating the delivery of liquid to the first and second intermediate storage reservoirs to force the compressed air therefrom during periods when compressed air is not being delivered thereto;

storing the compressed air forced from the second intermediate storage reservoir in a second storage tank;

maintaining the pressure of the air in the second storage tank at a predetermined level regardless of the volume of air in the tank; and alternating the delivery of compressed air from the first and second storage tanks to the pneumatic motor-generator.

* * * * *

UNITED STATES PATENT OFFICE
CERTIFICATE OF CORRECTION

Patent No. 4,058,979     Dated November 22, 1977

Inventor(s) Fernand Germain

It is certified that error appears in the above-identified patent and that said Letters Patent are hereby corrected as shown below:

On the cover sheet Item (30) Priority Data should read:

-- Oct. 2, 1975     France     ---------- 75.30155 --.

*Signed and Sealed this*

*Fourth* Day of *April 1978*

[SEAL]

Attest:

RUTH C. MASON     LUTRELLE F. PARKER
*Attesting Officer*     *Acting Commissioner of Patents and Trademarks*